United States Patent
Roy et al.

(10) Patent No.: US 10,601,486 B1
(45) Date of Patent: Mar. 24, 2020

(54) COMPRESSED BEAMFORMING FEEDBACK

(71) Applicant: Marvell International Ltd., Hamilton (BM)

(72) Inventors: Sayak Roy, Kolkata (IN); Ankit Sethi, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/260,881

(22) Filed: Jan. 29, 2019

Related U.S. Application Data

(60) Provisional application No. 62/646,250, filed on Mar. 21, 2018.

(51) Int. Cl.
*H04B 7/06* (2006.01)
*H04B 7/0417* (2017.01)

(52) U.S. Cl.
CPC ......... *H04B 7/0663* (2013.01); *H04B 7/0417* (2013.01); *H04B 7/0617* (2013.01); *H04B 7/0634* (2013.01)

(58) Field of Classification Search
CPC .. H04B 7/0413; H04B 7/0617; H04B 7/0456; H04B 7/0417; H04B 7/0639
See application file for complete search history.

(56) References Cited

U.S. PATENT DOCUMENTS

| | | | | |
|---|---|---|---|---|
| 2011/0310827 A1* | 12/2011 | Srinivasa | ............. | H04B 7/0434 370/329 |
| 2016/0233931 A1* | 8/2016 | van Zelst | ............... | H04B 17/12 |

* cited by examiner

*Primary Examiner* — Shuwang Liu
*Assistant Examiner* — Gina M McKie

(57) ABSTRACT

A method for providing a compressed beamforming feedback of a communication channel includes receiving, at a first communication device, a plurality of training signals from a second communication device via the communication channel, determining a channel matrix corresponding to the communication channel based on the plurality of training signals, precomputing a sequence of column sorting orders and/or a sequence of scaling factors based on a first intermediate matrix derived from the channel matrix in advance of performing a modified QR decomposition, performing the modified QR decomposition to derive the compressed beamforming feedback based on the first intermediate matrix with the precomputed column sorting orders and/or scaling factors as an input, and transmitting the compressed beamforming feedback from the first communication device to the second communication device to enable the second communication device to steer at least one subsequent transmission to the first communication device based on the compressed beamforming feedback.

28 Claims, 6 Drawing Sheets

COMPRESSED BEAMFORMING FEEDBACK

INCORPORATION BY REFERENCE

This present disclosure claims the benefit of U.S. Provisional Application No. 62/646,250, "Method and Apparatus to Pre-compute Certain Parameters for Steering Matrix Computations" filed on Mar. 21, 2018, which is incorporated herein by reference in its entirety.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. The IEEE 802.11ax Standard, now under development, promises to provide even greater throughput, such as throughputs in the tens of Gbps range.

SUMMARY

Aspects of the disclosure provide a method for providing a compressed beamforming feedback of a communication channel. In some embodiments, the method includes receiving, at a first communication device, a plurality of training signals from a second communication device via the communication channel, determining, at the first communication device, a channel matrix corresponding to the communication channel H based on the plurality of training signals, precomputing, at the first communication device, a sequence of column sorting orders and/or a sequence of scaling factors based on a first intermediate matrix B derived from the channel matrix H in advance of performing a modified QR decomposition, performing the modified QR decomposition to derive the compressed beamforming feedback based on the first intermediate matrix B with the precomputed column sorting orders and/or scaling factors as an input, and transmitting the compressed beamforming feedback from the first communication device to the second communication device to enable the second communication device to steer at least one subsequent transmission to the first communication device based on the compressed beamforming feedback.

In an embodiment, the sequence of column sorting orders and the sequence of scaling factors are determined based on norms and inner products of columns of the first intermediate matrix B.

In an embodiment, precomputing the sequence of column sorting orders and/or the sequence of scaling factors based on the first intermediate matrix B includes deriving the first intermediate matrix B according to $B=H^H H$, deriving a second intermediate matrix D according to $D_{N \times N} = B^H B$, and determining the sequence of column sorting orders and/or the sequence of scaling factors based on the second intermediate matrix D.

In an embodiment, determining the sequence of column sorting orders and/or the sequence of scaling factors based on the second intermediate matrix D includes (a) identifying a first maximum diagonal element of the second intermediate matrix D, (b) storing a column index of the first identified maximum diagonal element as order(1) that is a first column sorting order in the sequence of column sorting orders, (c) updating the remaining diagonal elements, except the identified first maximum diagonal element, of the second intermediate matrix D, according to $$d_{ii} \leftarrow d_{ii} - \frac{|d_{ij}|^2}{d_{jj}}, i \in \{1, \ldots, N\} \setminus \text{order}(1), j = \text{order}(1)$$

where d represents an element of the second intermediate matrix D, and i or j represents a row or column index, (d) identifying a second maximum diagonal element among the updated diagonal elements, and (e) storing a column index of the second identified maximum diagonal element as order(2) that is a second column sorting order in the sequence of column sorting orders.

In an embodiment, the determining the sequence of column sorting orders and/or the sequence of scaling factors based on the second intermediate matrix D further includes (f) updating non-diagonal elements of the column order(2) of the second intermediate matrix D with elements of column order (1) of the second intermediate matrix D according to $$d_{ij} \leftarrow d_{ij} - \frac{d_{ik} d_{jk}^*}{d_{kk}}, i \in \{1, \ldots, N\} \setminus \{\text{order}(1), \text{order}(2)\},$$

$$j = \text{order}(2), k = \text{order}(1),$$

and (g) updating the remaining diagonal elements, except the previously identified first and second maximum diagonal elements, of the second intermediate matrix D, according to $$d_{ii} \leftarrow d_{ii} - \frac{|d_{ij}|^2}{d_{jj}}, i \in \{1, \ldots, N\} \setminus \{\text{order}(1), \text{order}(2)\}, j = \text{order}(2),$$

(h) identifying a third maximum diagonal element among the diagonal elements updated at the step of (g), and (i) storing a column index of the third identified maximum diagonal element as order(3) that is a third column sorting order in the sequence of column sorting orders.

In an embodiment, determining the sequence of column sorting orders and/or the sequence of scaling factors based on the second intermediate matrix D further includes (j) updating non-diagonal elements of the column order(3) of the second intermediate matrix D with elements of column order (1) of the second intermediate matrix D according to $$d_{ij} \leftarrow d_{ij} - \frac{d_{ik} d_{jk}^*}{d_{kk}}, i \in \{1, \ldots, N\} \setminus \{\text{order}(l)\}_{l=1}^{3}, j = \text{order}(3), k = \text{order}(1),$$

(k) further updating the non-diagonal elements of the column order(3) that are updated at the step of (j) with elements of column order (2) of the second intermediate matrix D according to $$d_{ij} \leftarrow d_{ij} - \frac{d_{ik}d_{jk}^*}{d_{kk}}, i \in \{1, \ldots, N\} \backslash \{\text{order}(l)\}_{l=1}^{3},$$

$$j = \text{order}(3), k = \text{order}(2),$$

(l) updating the remaining diagonal elements, except the previously identified first, second and third maximum diagonal elements, of the second intermediate matrix D, according to $$d_{ii} \leftarrow d_{ii} - \frac{|d_{ij}|^2}{d_{jj}}, i \in \{1, \ldots, N\} \backslash \{\text{order}(l)\}_{l=1}^{3}, j = \text{order}(3),$$

(m) identifying a fourth maximum diagonal element among the diagonal elements updated at the step of (l), and (n) storing a column index of the fourth identified maximum diagonal element as order(4) that is a fourth column sorting order in the sequence of column sorting orders.

In an embodiment, determining the sequence of column sorting orders and/or the sequence of scaling factors based on the second intermediate matrix D further includes iterating the following steps for index k from 2, 3, . . . , N−1:

(i) updating non-diagonal elements of column order(k) with the elements of the columns from column order(1) to column order(k−1) according to
for each p=1, . . . , k−1, performing:

$$d_{ij} \leftarrow d_{ij} - \frac{d_{ir}d_{jr}^*}{d_{rr}}, i \in \{1, \ldots, N\} \backslash \{\text{order}(l)\}_{l=1}^{k},$$

$$j = \text{order}(k), r = \text{order}(p),$$

(ii) updating the remaining diagonal elements, except the previously identified maximum diagonal elements, according to $$d_{ii} \leftarrow d_{ii} - \frac{|d_{ij}|^2}{d_{jj}}, i \in \{1, \ldots, N\} \backslash \{\text{order}(l)\}_{l=1}^{k}, j = \text{order}(k),$$

(iii) determining a (k+1)-th maximum diagonal element among the diagonal elements updated at the step (ii), and (iv) storing a column index of the (k+1)-th identified maximum diagonal element as order(k+1) that is a (k+1)-th column sorting order in the sequence of column sorting orders.

In an embodiment, precomputing the sequence of column sorting orders and/or the sequence of scaling factors based on the first intermediate matrix B derived from the channel matrix H in advance of performing the modified QR decomposition includes determining a first scaling factor, QRscale (1), according to $$QRscale(1) = \frac{1}{\sqrt{d_{(\text{order}(1),\text{order}(1))}}},$$

and
determining scaling factors, QRscale(i), based on the resultant updated diagonal elements according to $$QRscale(i) = \sqrt{\frac{d_{(\text{order}(i-1),\text{order}(i-1))}}{d_{(\text{order}(i),\text{order}(i))}}}, i = 2, \ldots, N.$$

i=2, . . . , N.

In an embodiment, approximate eigenvalues of the B matrix is determined according to $$E(k) = \left\| (d_{i,j})_{i \in \{1, \ldots, N\}, j = \text{order}(k)} \right\|^{\frac{1}{2}}, k = 1,$$

$$E(k) = \left\| (d_{i,j})_{i \in \{1, \ldots, N\} \backslash \{\text{order}(l)\}_{l=1}^{k-1}, j = \text{order}(k)} \right\|^{\frac{1}{2}}, k = 2, \ldots, N$$

where k is an index of a column sorting order in the sequence of column sorting orders, and E(k) represents an eigenvalue corresponding to the column order(k) of the second intermediate matrix D.

In an embodiment, determining the sequence of column sorting orders and/or the sequence of scaling factors based on the second intermediate matrix D includes iterating the following steps for index s from 1 to N:

(1) determining a maximum diagonal element among all the diagonal elements of the second intermediate matrix D for s=1, or among the remaining (N+1−s) diagonal elements, i.e. except diagonal elements $\{\text{order}(l)\}_{l=1}^{s-1}$, of the second intermediate matrix D for s>1;

(2) storing a column index of the determined maximum diagonal element as order(s) that is the s-th sorting order of the sequence of column sorting orders;

(3) determining a number of shift-pairs, represented as Dsp(s), to bit-adjust the maximum diagonal element D(order(s), order(s)) such that one of the two leading bits of the element D(order(s), order(s)) is 1; and (4) applying a number of 2*Dsp(s) bit-shifts to all the diagonal elements for s=1, or to the remaining (N+1-s) diagonal elements, i.e. except diagonal elements $\{\text{order}(l)\}_{l=1}^{s-1}$, for s>1 of the D matrix.

In an embodiment, determining the sequence of column sorting orders and/or the sequence of scaling factors based on the second intermediate matrix D further comprises iterating the following steps for the index s from 1 to N−1:

(5) updating non-diagonal elements of column order(s) using previously updated columns according to
For r=1: s−1, iterating the following steps (i) and (ii), (i) Apply 2*Dsp(r) bit-shifts to the non-diagonal elements of column order(s) except those lying on rows having indices of $\{\text{order}(l)\}_{l=1}^{s-1}$, (ii) $d_{ij} \leftarrow d_{kk}d_{ij} - d_{ik}d_{jk}^*$, $i \in \{1, \ldots, N\} \backslash \{\text{order}(l)_{l=1}^{s}\}$, j=order(s), k=order(r), wherein the step (5) is skipped for s=1.

In an embodiment, the determining the sequence of column sorting orders and/or the sequence of scaling factors based on the second intermediate matrix D further includes iterating the following steps for the index s from 1 to N:

(6) applying 2*Dsp(s) bit-shifts to the non-diagonal elements of column order(s) lying on rows having indices of $i \in \{1, \ldots, N\} \backslash \{\text{order}(l)\}_{l=1}^{s}$.

In an embodiment, the determining the sequence of column sorting orders and/or the sequence of scaling factors based on the second intermediate matrix D further comprises iterating the following steps for the index s from 1 to N:

(7) updating non-zero elements among the remaining (N−s) diagonal elements, i.e. except diagonal elements $\{order(l)\}_{l=1}^{s}$, according to $$d_{ij} \leftarrow d_{jj}d_{ii} - |d_{ij}|^2, \quad i \in \{1, \ldots, N\} \backslash \{order(l)\}_{l=1}^{s}, \quad j=order(s),$$

wherein the step (7) is skipped for s=N.

In an embodiment, the determining the sequence of column sorting orders and/or the sequence of scaling factors based on the second intermediate matrix D further comprises performing the following initialization: AccumProd=1, AccumProdAdj=0, array QRshift(1:N)=0, and iterating the following steps for the index s from 1 to N:

(8) setting QRshift(s) according to
when the maximum diagonal element D(order(s), order(s)) is greater than or equal to AccumProd, setting QRshift(s)=AccumProdAdj+1, and
when the maximum diagonal element D(order(s), order(s)) is less than AccumProd, setting QRshift(s)=AccumProdAdj;

(9) updating AccumProd according to $$AccumProd \leftarrow AccumProd \times D_{(order(s), order(s))}; \text{ and}$$

(10) when both leading bits of the AccumProd updated at (9) are zero,
updating the AccumProd according to $$AccumProd \ll 2, \text{ and}$$

updating the AccumProdAdj according to $$AccumProdAdj = AccumProdAdj + 1,$$

wherein the step (8) is skipped for s=1.

In an embodiment, determining the sequence of column sorting orders and/or the sequence of scaling factors based on the second intermediate matrix D further comprises iterating the following step for the index s from 1 to N:

(11) determining an approximate eigenvalue E(s) of the first intermediate matrix B corresponding to column order(s) of the D matrix by performing
  (i) computing $\alpha(s) = \|(d_{i,order(s)})_{i \in \{1, \ldots, N\} \backslash \{order(l)\}_{l=1}^{s-1}}\|$,
  (ii) setting $\beta(s)$=AccumProd,
  (iii) setting $\delta(s)=(AccumProdAdj - \Sigma_{i=1}^{s} Dsp(0)$, and
  (iv) determining the approximate eigenvalue E(s) according to $$E(s) = \frac{\alpha(s)}{\sqrt{\beta(s)}} \times 2^{\delta(s)}.$$

In an embodiment, determining the sequence of column sorting orders and/or the sequence of scaling factors based on the second intermediate matrix D further includes finalizing the QRshift array according to
  QRshift(1)←Dsp(1), and
  For s=N:−1:2, $$QRshift(s) \leftarrow Dsp(s) - QRshift(s) + QRshift(s-1),$$

wherein s changes from N to 2 with a step value of −1.

In an embodiment, determining the sequence of column sorting orders and/or the sequence of scaling factors based on the second intermediate matrix D further includes stopping the iteration of steps (1)-(11) after the approximate eigenvalue E(N) is determined.

In an embodiment, determining the sequence of column sorting orders and/or the sequence of scaling factors based on the second intermediate matrix D further includes aborting the iteration of the steps (1)-(11) when the maximum diagonal element determined at the step (1) is zero or negative.

In an embodiment, the method further includes after the abortion operation, performing the modified QR decomposition to derive the compressed beamforming feedback based on the first intermediate matrix B with the partially obtained sequences of column sorting orders and scaling factors as the input.

In an embodiment, performing the modified QR decomposition to derive the compressed beamforming feedback based on the first intermediate matrix B with the precomputed column sorting orders and/or scaling factors as the input comprises sorting columns of the first intermediate matrix B according to the sequence of column sorting orders each indicating a column index.

In an embodiment, performing the modified QR decomposition to derive the compressed beamforming feedback based on the first intermediate matrix B with the precomputed column sorting orders and/or scaling factors as the input further includes (a) scaling elements of the sorted intermediate matrix B with a scaling factor in the sequence of scaling factors corresponding to the first column of the sorted intermediate matrix B, and (b) performing a set of QR decomposition operations to null out elements, except the first element, of the first column of the sorted intermediate matrix B to generate a submatrix.

In an embodiment, performing the modified QR decomposition to derive the compressed beamforming feedback based on the first intermediate matrix B with the precomputed column sorting orders and/or scaling factors as the input further includes (c) scaling elements of the submatrix generated from the previous step with a scaling factor in the sequence of scaling factors corresponding to a first column of the submatrix, and (d) performing a set of QR decomposition operations to null out elements, except the first element, of the first column of the submatrix.

In an embodiment, performing the modified QR decomposition to derive the compressed beamforming feedback based on the first intermediate matrix B with the precomputed column sorting orders and/or scaling factors as the input further includes (e) iterating the steps of (c) and (d) until the intermediate matrix B is reduced to an upper triangular matrix.

In an embodiment, the set of QR decomposition operations performed during each iteration includes phase rotations and Given's rotations. In an embodiment, angles obtained from the phase rotations and Given's rotations are part of the compressed beamforming feedback. In an embodiment, the set of QR decomposition operations are performed with a coordinate rotation digital computer (CORDIC) block.

In an embodiment, the method further includes deriving approximate eigenvalues of the first intermediate matrix B based on a matrix R resulting from the modified QR decomposition and the precomputed scaling factors.

Aspects of the disclosure provide a first communication device. The first communication device includes circuitry configured to receive a plurality of training signals from a second communication device via a communication channel, determine a channel matrix corresponding to the communication channel H based on the plurality of training signals, precompute a sequence of column sorting orders and/or a sequence of scaling factors based on a first intermediate matrix B derived from the channel matrix H in advance of performing a modified QR decomposition, perform the modified QR decomposition to derive a compressed beamforming feedback based on the first intermediate matrix B with the precomputed column sorting orders and/or scaling factors as an input, and transmit the compressed beamforming feedback to the second communication device to enable the second communication device to steer at least one subsequent transmission to the first communication device based on the compressed beamforming feedback.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
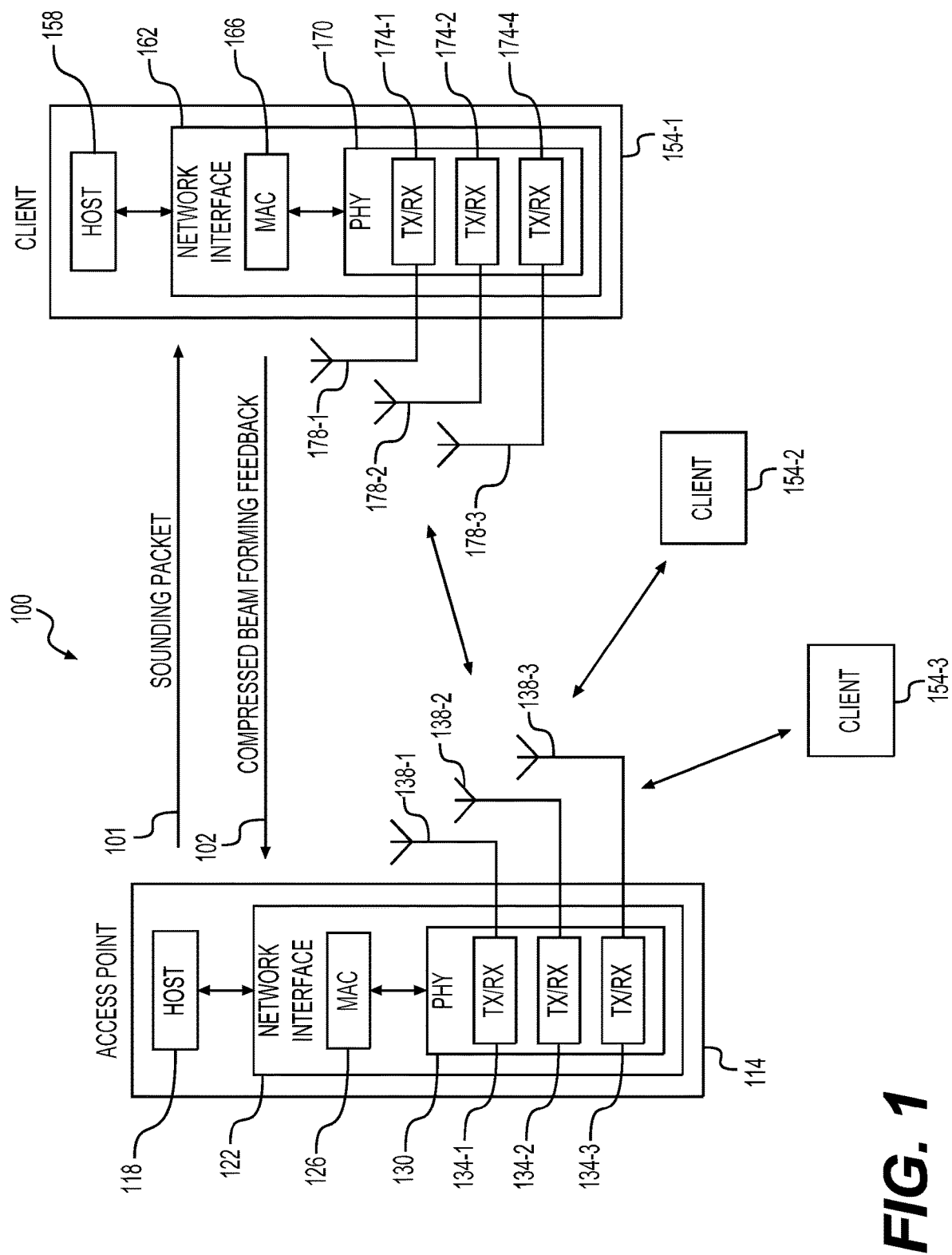
FIG. 1 is a block diagram of an example wireless local area network (WLAN) 100 according to an embodiment.

The present disclosure describes beamforming feedback techniques. For illustrative purposes, some embodiments of this disclosure are described in the context of a wireless local area network (WLAN) system that utilize protocols the same as or similar to protocols defined by the 802.11 standards from the Institute of Electrical and Electronics Engineers (IEEE). However, in other embodiments, the beamforming feedback techniques are utilized in other types of wireless or wired communication systems such as mobile communication networks (e.g., cellular networks), power line communication systems, and the like.

In embodiments described below, a wireless network device such as an access point (AP) of a wireless local area network (WLAN) transmits data streams to one or more client stations. In some embodiments, the WLAN supports multiple input multiple output (MIMO) communication in which the AP and/or the client stations include more than one antenna, thereby creating a plurality of spatial (or space-time) streams over which data can be transmitted simultaneously.

In an embodiment in which the AP employs multiple antennas for transmission, the AP utilizes various antennas to transmit the same signal while phasing (and amplifying) this signal as it is provided to the various transmit antennas to achieve beamforming or beamsteering. In order to implement a beamforming technique, the AP generally requires knowledge of certain characteristics of the communication channel (e.g., channel matrix, channel state information, channel estimate, and the like) between the AP and the one or more client stations for which a beamforming pattern is to be created.

To obtain channel characteristics, according to an embodiment, the AP transmits to a client station a sounding packet. The sounding packet can include a number of training fields that allow the client station to accurately estimate the MIMO channel. The client station then transmits or feeds back, in some form, the obtained channel characteristics to the AP. For example, channel characteristic information can be included in a management or a control frame transmitted to the AP. Upon receiving, from one or more of the client stations, information characterizing the corresponding communication channels, the AP can generate desired beam patterns to be used in subsequent transmissions to one or more stations.

In an embodiment, a client station obtains a channel matrix using training signals from the AP. The client station then decomposes a channel matrix, or an intermediate matrix derived from the channel matrix, to jointly determine a steering matrix and a compressed beamforming feedback. The compressed beamforming feedback includes compressed information, such as angles that represent the steering matrix. The compressed beamforming feedback can be transmitted to the AP and be used to reconstruct the steering matrix by the AP. To efficiently generate the compressed beamforming feedback, in an embodiment, the client station generates the compressed beamforming feedback using parameter precomputation techniques in combination with a modified QR decomposition process.

For example, in some embodiments, during the modified QR decomposition process, an intermediate matrix derived from the channel matrix is decomposed through multiple stages. At each stage, a set of QR decomposition operations is performed. Before the beginning of the modified QR decomposition, in some embodiments, the parameter precomputation techniques are employed to precompute a sequence of column sorting orders and a sequence of scaling factors. The precomputed sorting orders and scaling factors are subsequently provided as an input to the modified QR decomposition process. Compared with determining the column sorting orders and scaling factors at each stage of the modified QR decomposition process as implemented in some examples, precomputing the column sorting orders and scaling factors in advance of starting the modified QR decomposition allows the client station to determine the compressed beamforming feedback faster and with lower computation complexity in at least some embodiments.

FIG. 1 is a block diagram of an example WLAN 100 according to an embodiment. The WLAN 100 implements the parameter precomputation techniques described herein. The WLAN 100 includes an access point (AP) 114 and a plurality of client stations 154 in an embodiment. Although three client stations 154 are illustrated in FIG. 1, the WLAN 100 includes other suitable numbers (e.g., 1, 2, 4, 5, 6, etc.) of client stations 154 in various embodiments.

The AP 114 comprises a host processor 118 coupled to a network interface device 122. The network interface device 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130.

The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 includes circuitry (e.g., in the transceivers 134) configured to upconvert baseband signals to radio frequency (RF) signals for wireless transmission via the antennas 138.

Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units. The PHY processor 130 includes circuitry (e.g., in the transceivers 134) configured to downconvert RF signals received via the antennas 138 to baseband signals.

The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol.

The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 includes circuitry (e.g., in the transceivers 174) configured to upconvert baseband signals to RF signals for wireless transmission via the antennas 178.

Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units. The PHY processor 170 includes circuitry (e.g., in the transceivers 174) configured to downconvert RF signals received via the antennas 178 to baseband signals.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, the AP 114 is configured to implement beamforming for transmissions to one or more client stations 154 using knowledge of characteristics of the communication channels between the one or more client stations 154 and the AP 114. To obtain knowledge of characteristics of a communication channel between the AP 114 and a client station 154 (e.g., the client station 154-1), in an embodiment, the AP 114 transmits known training signals to the client stations 154-1. For example, in an embodiment, the AP 114 transmits a sounding packet 101 to the client station 154-1, wherein the sounding packet 101 includes one or more training fields (e.g., long training fields (LTF)) that include the training signals.

In an embodiment, the AP 114 transmits training signals to the client station 154-1 via a MIMO channel formed by the transmit antenna 138 and the receive antenna 178. The client station 154-1 receives the training signals from the AP 114 and develops a channel description of the MIMO channel based on the training signals received from the AP 114. In mathematical terms, a signal received by the client station 154-1 from the AP 114 via the communication channel can be written as:

$$y_{Nr \times 1} = H_{Nr \times Nt} x_{Nt \times 1} + w_{Nr \times 1}$$

where y is a received signal vector, Nr is a number of receive antennas; Nt is a number of transmit antennas; H is a channel matrix corresponding to the communication channel; x is a transmitted signal vector; and w is an additive noise vector. The client station 154-1 determines the channel matrix H based on the received signal y and its knowledge of the transmitted training signal x, in an embodiment. In an embodiment in which OFDM communication is used, the client station 154-1 determines a plurality of channel matrices $H_i$, respective ones of the channel matrices $H_i$ corresponding to respective OFDM tones (subcarriers) in the communication channel.

Based on the determined one or more channel matrices $H_i$, the client station 154-1 generates a compressed beamforming feedback 102 to be transmitted to the AP 114. The compressed beamforming feedback 102 includes information (e.g., angles) that represents the one or more steering matrices determined based on the one or more channel matrices $H_i$, in an embodiment. In an embodiment, the client station 154-1 is configured to jointly determine, based on a channel matrix H, a steering matrix and compressed beamforming feedback that represents the steering matrix. For example, as explained in more detail below, the client station 154-1 is configured to implement the parameter precomputation technique to determine the compressed beamforming feedback in a modified QR decomposition process in an embodiment.

According to an embodiment, the client station 154-1 is configured to determine a compressed beamforming feedback by performing QR decomposition of a symmetric intermediate matrix derived from the channel matrix. Generally, for purpose of beamforming feedback, a right-singular matrix of the channel matrix can be obtained from a singular value decomposition (SVD) of the channel matrix, and used as a steering matrix. In contrast, QR decomposition of the symmetric intermediate matrix results in an orthogonal matrix Q and an upper triangular matrix R, where the orthogonal matrix Q is a sufficiently good approximation of singular vectors (e.g., eigenvectors) of the symmetric matrix. Accordingly, the orthogonal matrix Q is a sufficiently good approximation of a right-singular matrix of the channel matrix, and used as a steering matrix.

In some embodiments, the client station 154-1 is configured to perform a modified QR decomposition of a symmetric intermediate matrix derived from the channel matrix to determine a compressed beamforming feedback. The modified QR decomposition improves QR decomposition by adding one or both of i) sorting columns of matrices operated on during each stage of QR decomposition such that dominant vectors are determined in each stage of QR decomposition and ii) dynamically scaling elements of matrices operated on during each stage of QR decomposition to prevent overflow, preserve significant bits, and improve precision of computation using fixed point arithmetic operations. Examples of modified QR decomposition without using the parameter precomputation techniques are described in Sayak et al. U.S. patent application Ser. No. 15/844,274, filed Dec. 15, 2017, which is hereby incorporated by reference herein in its entirety.

In the examples of modified QR decomposition without using the parameter precomputation techniques as described in Sayak, column sorting orders and scaling factors useful for operations of column sorting and element scaling are determined based on an intermediate matrix at each stage of QR decomposition while the modified QR decomposition process is being performed. However, in some implementations, QR decomposition operations are performed with Coordinate Rotation Digital Computer (CORDIC) circuits (e.g., CORDIC blocks), and thus follows a certain schedule. Under such a configuration, performing computation tasks related to sorting of columns and computation of scaling factors can disrupt the scheduling of QR decomposition. For example, sorting of columns and calculating scaling factors may delay the QR decomposition process operations performed at each stage of QR decomposition. To solve the above problem, the parameter precomputation techniques are employed in embodiments described herein. By implementing the parameter precomputation techniques, determination of orders for column sorting and factors for scaling matrix elements are separated from operations of the modified QR decomposition, thereby accelerating the whole process of generating the compressed beamforming feedback.

In addition, in contrast to the examples described in Sayak in which sorting orders and scaling factors are determined based on vector basis, the parameter precomputation techniques use norms and inner-products of columns of an intermediate matrix to determine sorting orders and scaling factors, which significantly brings down the computation complexity.

As a result, beamforming feedback computation with the parameter precomputation techniques can be performed quicker, with less hardware, less physical area, less power consumption, etc., compared with determining sorting orders and scaling factors while performing a modified QR decomposition process.

Figure 2:
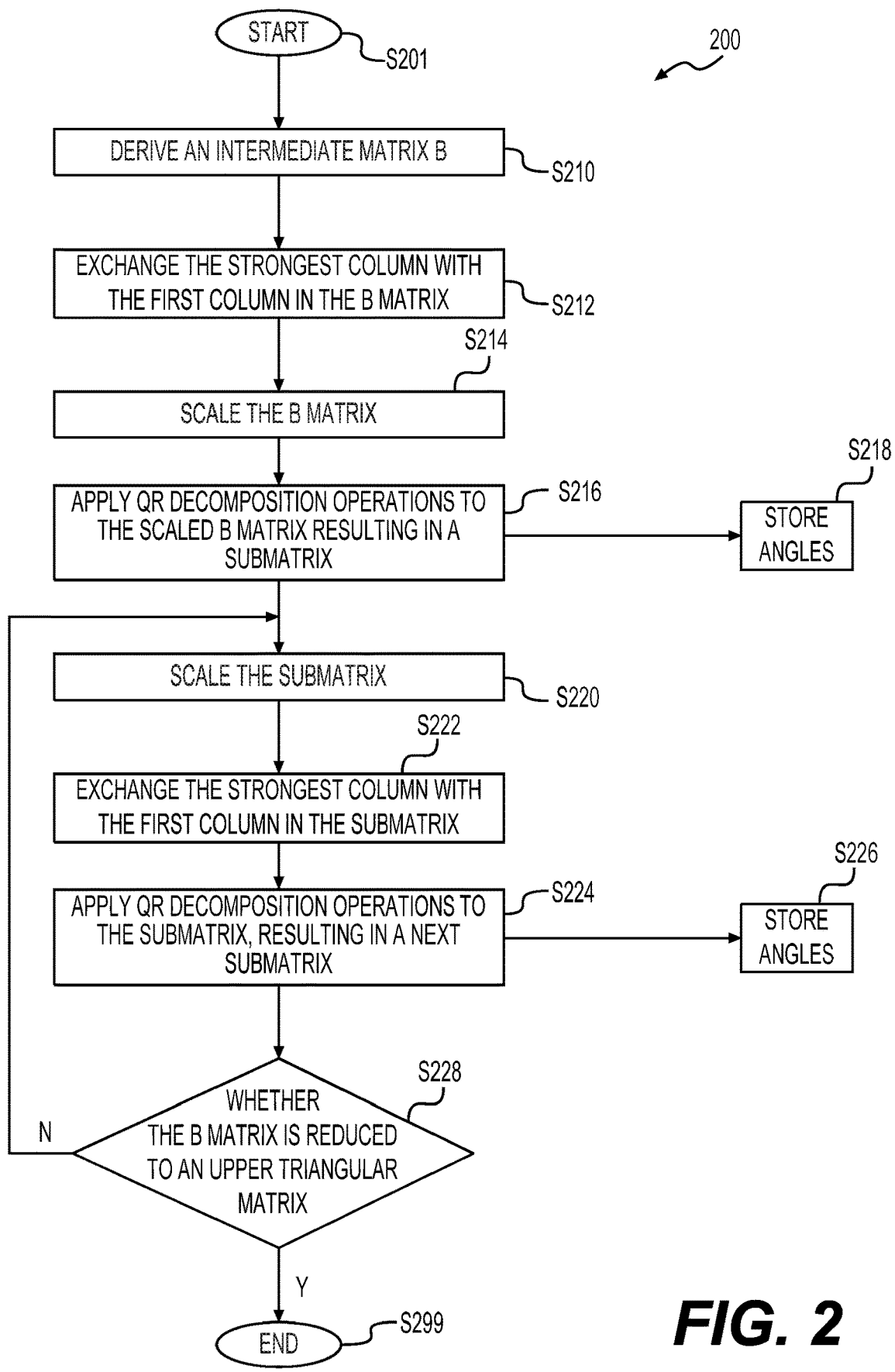
FIG. 2 shows a flowchart of an example modified QR decomposition process 200 without implementing the parameter precomputation techniques.

FIG. 2 shows a flowchart of an example modified QR decomposition process 200 without implementing the parameter precomputation techniques. During the process 200, column sorting order determination (i.e., determination of the maximum norm value) and matrix elements scaling factor determination are performed at each stage of QR decomposition, instead of being precomputed. The process 200 jointly determines a steering matrix and a compressed beamforming feedback (e.g. angles) that represents the steering matrix. The process 200 is explained with reference to the client station 154-1 in FIG. 1. The process 200 starts from S201 and proceeds to S210.

At S210, an intermediate matrix B is derived from the channel matrix H corresponding to a tone of the MIMO-OFDM channel between the AP 114 and the client station 154-1. In an example, the intermediate matrix B is determined by multiplying together the channel matrix H and a Hermitian transpose of the channel matrix H, according to $$B_{N \times N} = H^H H$$

where the Hermitian operator $^H$ stands for conjugate transpose. The channel matrix H has dimensions of Nr x Nt. Accordingly, the determined intermediate matrix B is a square symmetric matrix having dimensions of N×N and N=Nt. A matrix with dimensions of 4×4 shown below is used as an example of the B matrix for explanation of the process 200, $$B = \begin{bmatrix} b_{11} & b_{12} & b_{13} & b_{14} \\ b_{21} & b_{22} & b_{23} & b_{24} \\ b_{31} & b_{32} & b_{33} & b_{34} \\ b_{41} & b_{42} & b_{43} & b_{44} \end{bmatrix}.$$

After the intermediate matrix B is obtained, a multiple stage QR decomposition is carried out in the steps from S212 to S228. During each stage, a set of QR decomposition operations are performed (e.g., at S216 or S224) to null out all but the first element of the first column of the matrix B in the first stage or a submatrix in the subsequent stages. Meanwhile, a set of angles are obtained at each such stage. The angles resulting at those stages form the compressed beamforming feedback that represents the steering matrix.

Specifically, at S212, the strongest column (i.e., the column with a maximum norm value) of the matrix B is determined and exchanged with the first column of the matrix B. In this way, the dominant steering vector of the steering matrix resulting from the process 200 is identified, thereby improving approximation of the steering matrix.

At S214, the matrix B after the exchanging operation of S212 is scaled with a scaling factor such that the maximum column norm of the matrix B lies between two predefined thresholds, for example, 0.5 and 1. As a result of the scaling operation, as seen below, the most significant bits of the maximum column norm (after the scaling) of the matrix B are preserved.

At S216, a set of QR decomposition operations are applied to the matrix B after the scaling operation at S214 to null out all but the first element of the first column of matrix B. In an embodiment, phase rotations are first performed on the scaled matrix B to make the elements of the first column of the scaled matrix B real positive numbers. Givens rotations are subsequently performed on the phase-rotated matrix to zero out the elements except the first element in the first column of the phase-rotated matrix. A set of angles resulting from the phase rotation and Givens rotation operations are stored to a memory at S218. The set of angles include angles used in the phase rotation operations, and angles used in the Givens rotation operations. The set of angles provide a first portion of the compressed beamforming feedback that represents the steering matrix.

After the set of QR decomposition operations, the matrix B becomes, $$\begin{bmatrix} b'_{11} & b'_{12} & b'_{13} & b'_{14} \\ 0 & b'_{22} & b'_{23} & b'_{24} \\ 0 & b'_{32} & b'_{33} & b'_{34} \\ 0 & b'_{42} & b'_{43} & b'_{44} \end{bmatrix}$$

where the element $b_{11}'$ is the norm of the first column since the QR decomposition operations are orthogonal operations and hence preserve the column norm. Because of the scaling operation at S214, the most significant bits of the element $b_{11}'$ are preserved, thereby improving the approximation of the steering matrix. In addition, a submatrix, $$\begin{bmatrix} b'_{22} & b'_{23} & b'_{24} \\ b'_{32} & b'_{33} & b'_{34} \\ b'_{42} & b'_{43} & b'_{44} \end{bmatrix}$$

results from the set of QR decomposition operations, and is processed during the subsequent steps of a next stage QR decomposition.

The steps S220-S226 form another stage of QR decomposition, and include operations similar to that of the steps S212-S218, respectively. However, different from the steps S212-S218, the submatrix resulted from S216 shown above is processed at the steps S220-S226. As a result of this stage of QR decomposition, the elements $b_{32}'$ and $b_{42}'$ are nulled out as shown below, $$\begin{bmatrix} b''_{22} & b''_{23} & b''_{24} \\ 0 & b''_{33} & b''_{34} \\ 0 & b''_{43} & b''_{44} \end{bmatrix}.$$

The submatrix, $$\begin{bmatrix} b''_{33} & b''_{34} \\ b''_{43} & b''_{44} \end{bmatrix}$$

is to be processed during a further next stage of QR decomposition. In addition, a set of angles are obtained from the respective phase rotation and Givens rotation operations, and stored in the memory at S226. The set of angles provide a second portion of the compressed beamforming feedback that represents the steering matrix.

At S228, it is examined whether the matrix B is reduced to an upper triangular matrix. If not, another round of QR decomposition including the steps S220-S226 is performed until the matrix B is reduced to an upper triangular matrix. When the matrix B is reduced to an upper triangular matrix, the process 200 proceeds to S299 and terminates at S299. At the end of the process 200, the resultant upper triangular matrix is an R matrix, and the angles resulting from each stage of QR decomposition together form the compressed beamforming feedback.

Figure 3:
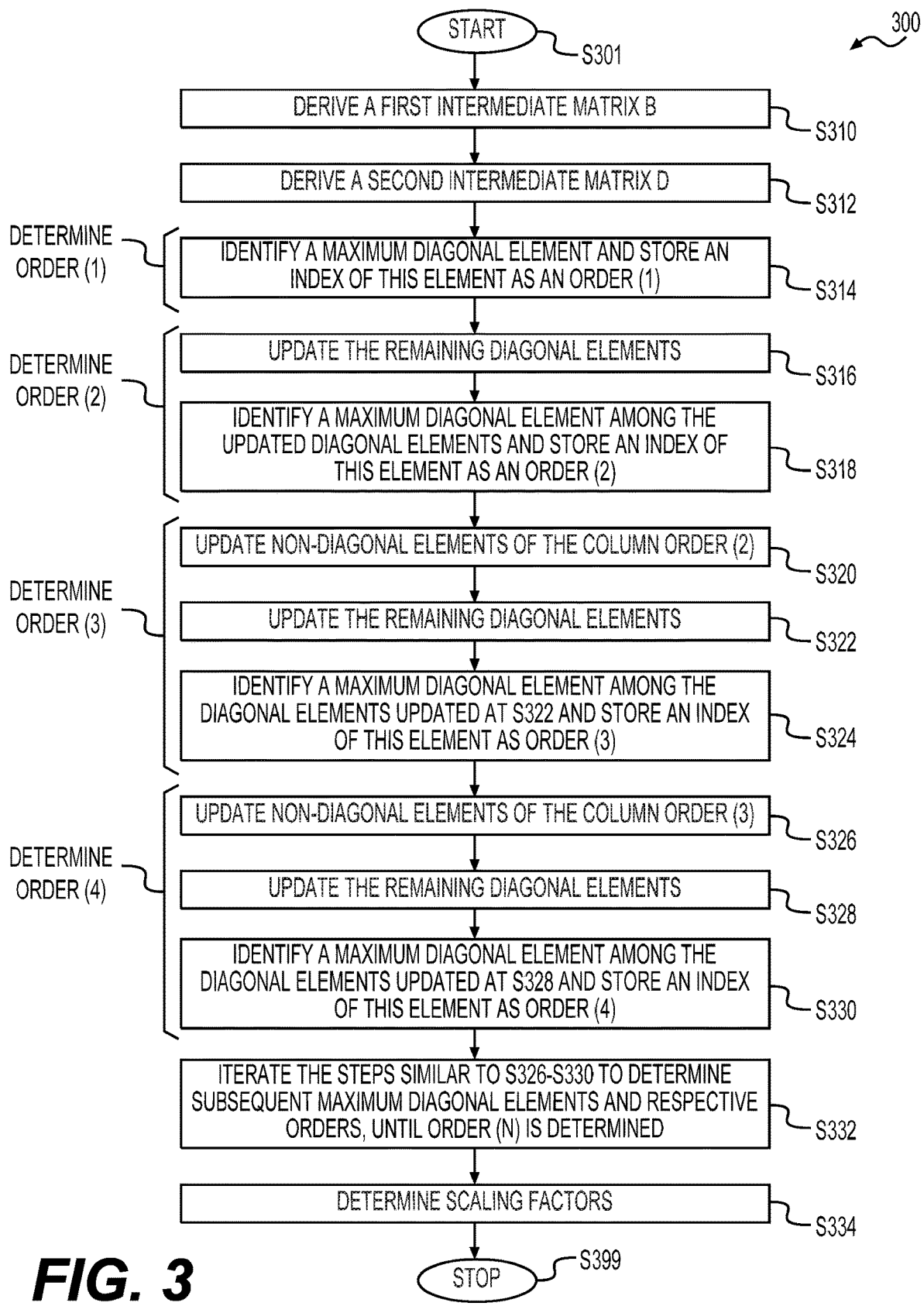
FIG. 3 shows a flowchart of an example process 300 for precomputing column sorting orders and scaling factors from an intermediate matrix B according to some embodiments of the disclosure.

FIG. 3 shows a flowchart of an example process 300 for precomputing column sorting orders and scaling factors from an intermediate matrix B according to some embodiments of the disclosure. During the process 300, the column sorting orders and the scaling factors are computed using norms and inner products of the columns of the intermediate matrix B. Thus, computation complexity is reduced compared with determining the column sorting orders and scaling factors based on column vectors of the intermediate matrix B in at least some embodiments. The precomputed column sorting orders and scaling factors can subsequently be used for performing a modified QR decomposition process upon the intermediate matrix B. The process 300 corresponds to a first scheme of the parameter precomputation techniques. Similarly, the process 300 is explained with reference to the client station 154-1 in FIG. 1. The process 300 starts from S301 and proceeds to S310.

At S310, similar to S210 in the process 200, a first intermediate matrix B is derived from the channel matrix H corresponding to a tone of the MIMO-OFDM channel between the AP 114 and the client station 154-1. In an example, the first intermediate matrix B is determined according to $$B_{N \times N} = H^H H.$$

The determined intermediate matrix B is a square symmetric matrix having dimensions of N×N.

At S312, a second intermediate matrix D is derived from the first intermediate matrix B. In an example, the second intermediate matrix D is determined according to $$D_{N \times N} = B^H B.$$

The determined second intermediate matrix D is a square symmetric matrix having dimensions of N×N. An $(i,j)^{th}$ element, $d_{ij}$, of the D matrix is the inner product of the $i^{th}$ and $j^{th}$ column vectors, $\vec{b}_j$ and $\vec{b}_i$, of the B matrix as shown below $$d_{ij} = <\vec{b}_j, \vec{b}_i> = \vec{b}_i^H \vec{b}_j.$$

In addition, $d_{ii}$ indicates the norm-square of the $i^{th}$ column of the B matrix. Operations of the following steps in the process 300 are performed based on the norms (or norm-squares) and inner products in the D matrix.

At S314, a first maximum diagonal element of the D matrix is identified. The column or row index of the identified maximum diagonal element is stored in a memory as order(1). The order(1) is one of a sequence of column sorting orders that are obtained the end of the process 300. The sequence of column sorting orders includes order(1), order(2), and the like, until order(N), in an embodiment. Each column sorting order corresponds to an index that indicates a column of the B matrix, and can be used to sort the columns of the B matrix for performing a modified QR decomposition.

At S316, in order to determine the order(2), the remaining diagonal elements of the D matrix except the one identified at S314 are updated according to $$d_{ii} \leftarrow d_{ii} - \frac{|d_{ij}|^2}{d_{jj}}, i \in \{1, \ldots, N\} \setminus \text{order}(1), j = \text{order}(1)$$

where a diagonal element $d_{ii}$ is replaced with $$d_{ii} - \frac{|d_{ij}|^2}{d_{jj}} \cdot |d_{ij}|$$

represents a norm value or an absolute value of the element $d_{ij}$. The symbol \ represents an excluding operation, and thus the diagonal element with the index of order(1) is excluded from the diagonal elements having indices in the set $\{1, \ldots, N\}$. The above remaining diagonal elements updating operation corresponds to operations of a QR decomposition stage where contributions of a strongest column are subtracted from the other columns of a submatrix corresponding to this QR decomposition stage.

At S318, a second maximum diagonal element is identified among the updated diagonal elements, and the column or row index of the second identified maximum diagonal element is stored in the memory as order(2).

At S320, in order to determine the order(3), the non-diagonal elements of column order(2) (the column having an index of order(2)) are updated with the elements of column order(1) (the column having an index of order(1)) according to $$d_{ij} \leftarrow d_{ij} - \frac{d_{ik} d_{jk}^*}{d_{kk}}, i \in \{1, \ldots, N\} \setminus \{\text{order}(1), \text{order}(2)\},$$

$$j = \text{order}(2), k = \text{order}(1)$$

where $d_{jk}^*$ is a complex conjugate of $d_{jk}$. As can be seen, the non-diagonal element of column order(2) in the row order(1) is not updated.

At S322, the remaining diagonal elements except the two previously identified maximum elements are updated with the updated elements of column order(2) (that are updated at S320) according to $$d_{ii} \leftarrow d_{ii} - \frac{|d_{ij}|^2}{d_{jj}}, i \in \{1, \ldots, N\} \setminus \{\text{order}(1), \text{order}(2)\}, j = \text{order}(2).$$

At S324, a third maximum diagonal element is identified among the diagonal elements updated at S322, and the column or row index of the third identified maximum diagonal element is stored in the memory as order(3).

At S326, in order to determine the order(4), the non-diagonal elements of column order(3) are updated with the elements of column order(1) and column order(2) successively. For example, the non-diagonal elements of column order(3) are first updated with the elements of column order(1) according to $$d_{ij} \leftarrow d_{ij} - \frac{d_{ik} d_{jk}^*}{d_{kk}}, i \in \{1, \ldots, N\} \setminus \{\text{order}(l)\}_{l=1}^{3},$$

$$j = \text{order}(3), k = \text{order}(1).$$

As can be seen, the indices of order(1), order(2), and order(3) are excluded from the set $\{1, \ldots, N\}$. Then, the updated non-diagonal elements of column order(3) are further updated with the elements of column order(2) according to $$d_{ij} \leftarrow d_{ij} - \frac{d_{ik} d_{jk}^*}{d_{kk}}, i \in \{1, \ldots, N\} \setminus \{\text{order}(l)\}_{l=1}^{3},$$

$$j = \text{order}(3), k = \text{order}(2).$$

At S328, the remaining diagonal elements except the three previously identified maximum diagonal elements are updated with the elements of column order(3) (that are updated at S326) according to $$d_{ii} \leftarrow d_{ii} - \frac{|d_{ij}|^2}{d_{jj}}, i \in \{1, \ldots, N\} \setminus \{\text{order}(l)\}_{l=1}^{3}, j = \text{order}(3).$$

At S330, a fourth maximum diagonal element is identified among the diagonal elements updated at S328, and the column or row index of the fourth identified maximum diagonal element is stored in the memory as order(4).

At S332, the steps similar to S326-S330 are iterated to determine subsequent maximum diagonal elements and respective orders in the sequence of column sorting orders until a last maximum diagonal element is updated and identified, and a respective column or row index is stored as the order(N). The resultant sequence of orders is used as an input to the modified QR decomposition process in an embodiment.

In general, in some embodiments, for finding the $r^{th}$ maximum diagonal element, the non-diagonal elements of the order$(r-1)^{th}$ column are updated with all previous columns (such as column order(1) followed by column order(2) followed by column order(3) and so on up to column order$(r-2)$). In addition, elements of the order$(r-1)^{th}$ column having row indices corresponding to the row/column indices of the previously identified diagonal elements (i.e. order(1) to order(r−2)) are not updated. These updated non-diagonal elements together with the diagonal element of the order(r−1)-th column of the D matrix are used to update the remaining diagonal elements of the matrix D. The index of a maximum diagonal element among those updated remaining diagonal elements is stored as the order(r).

In an embodiment, a process corresponding to the operations of the steps S320-S332 is performed as follows. Following the step S318, for each k=2, 3, . . . , N−1, the following steps are iterated: (i) updating non-diagonal elements of column order(k) with the elements of the columns from order(l) to order (k−1). Specifically, the non-diagonal elements of the column order(k) is updated according to for each p=1, . . . , k−1, performing:

$$d_{ij} \leftarrow d_{ij} - \frac{d_{ir}d_{jr}^*}{d_{rr}}, i \in \{1, \ldots, N\} \setminus \{\text{order}(l)\}_{l=1}^k, j = \text{order}(k), r = \text{order}(p).$$

(ii) updating the remaining diagonal elements, except the previously identified maximum diagonal elements, according to $$d_{ii} \leftarrow d_{ii} - \frac{|d_{ij}|^2}{d_{jj}}, i \in \{1, \ldots, N\} \setminus \{\text{order}(l)\}_{l=1}^k, j = \text{order}(k).$$

(iii) determining a (k+1)-th maximum diagonal element among the diagonal elements updated at the step (ii), and the column or row index of the (k+1)-th identified maximum diagonal element is stored in the memory as order(k+1).

At S334, a sequence of scaling factors from QRscale(1) to QRscale(N) are determined according to the resultant updated diagonal elements in an embodiment according to $$QRscale(1) = \frac{1}{\sqrt{d_{(\text{order}(1),\text{order}(1))}}}$$

$$QRscale(i) = \sqrt{\frac{d_{(\text{order}(i-1),\text{order}(i-1))}}{d_{(\text{order}(i),\text{order}(i))}}}, N \geq i \geq 2.$$

The sequence of scaling factors is used as an input to a modified QR decomposition process in an embodiment. For example, in a modified QR decomposition process similar to the process 200 in the FIG. 2 example, contributions of the strongest column are subtracted from the other columns at each stage. At the end of each set of such operations at each stage, the elements of the remaining part (the submatrix) become smaller in magnitude. Hence leading bits of those elements often remain unused. Corresponding to this situation, after establishing each column of Q after the respective phase rotations and Given's rotations, the "active" part (meaning the submatrix part which will be used for computing the other columns of Q) is scaled with one of the sequence of scaling factors derived by performing the process 300 in an embodiment. The scaling operations optimize the usage of bits and improve the precision of the steering matrix obtained from the respective modified QR decomposition process in at least some embodiments. For example, by the scaling operations, the diagonal elements of the resultant R matrix of a modified QR decomposition process are forced to be one or close to 1 in an embodiment.

After the sequence of scaling factors is determined, the process 300 proceeds to S399, and terminates at S399.

In an embodiment, approximate eigenvalues of the B matrix are computed during the process 300 according to $$E(k) = \left\| (d_{i,j})_{i \in \{1,\ldots,N\}, j=\text{order}(k)} \right\|^{\frac{1}{2}}, k = 1,$$

$$E(k) = \left\| (d_{i,j})_{i \in \{1,\ldots,N\} \setminus \{\text{order}(l)\}_{l=1}^{k-1}, j=\text{order}(k)} \right\|^{\frac{1}{2}}, k = 2, \ldots, N.$$

where k is an index of an order in the sequence of orders, E(k) represents an eigenvalue of the first intermediate matrix B corresponding to column order(k). The eigenvalue E(k) is derived from a norm of a vector formed by the diagonal element of the column order(k) and non-diagonal elements of the column order(k) that are updated after the order(k) is determined during the process 300. In an embodiment, each eigenvalue E(k) for k=2, . . . , N−1 is calculated at a step that follows the step where non-diagonal elements of the column order(k) that are updated during each iteration in the process 300.

Figure 4:
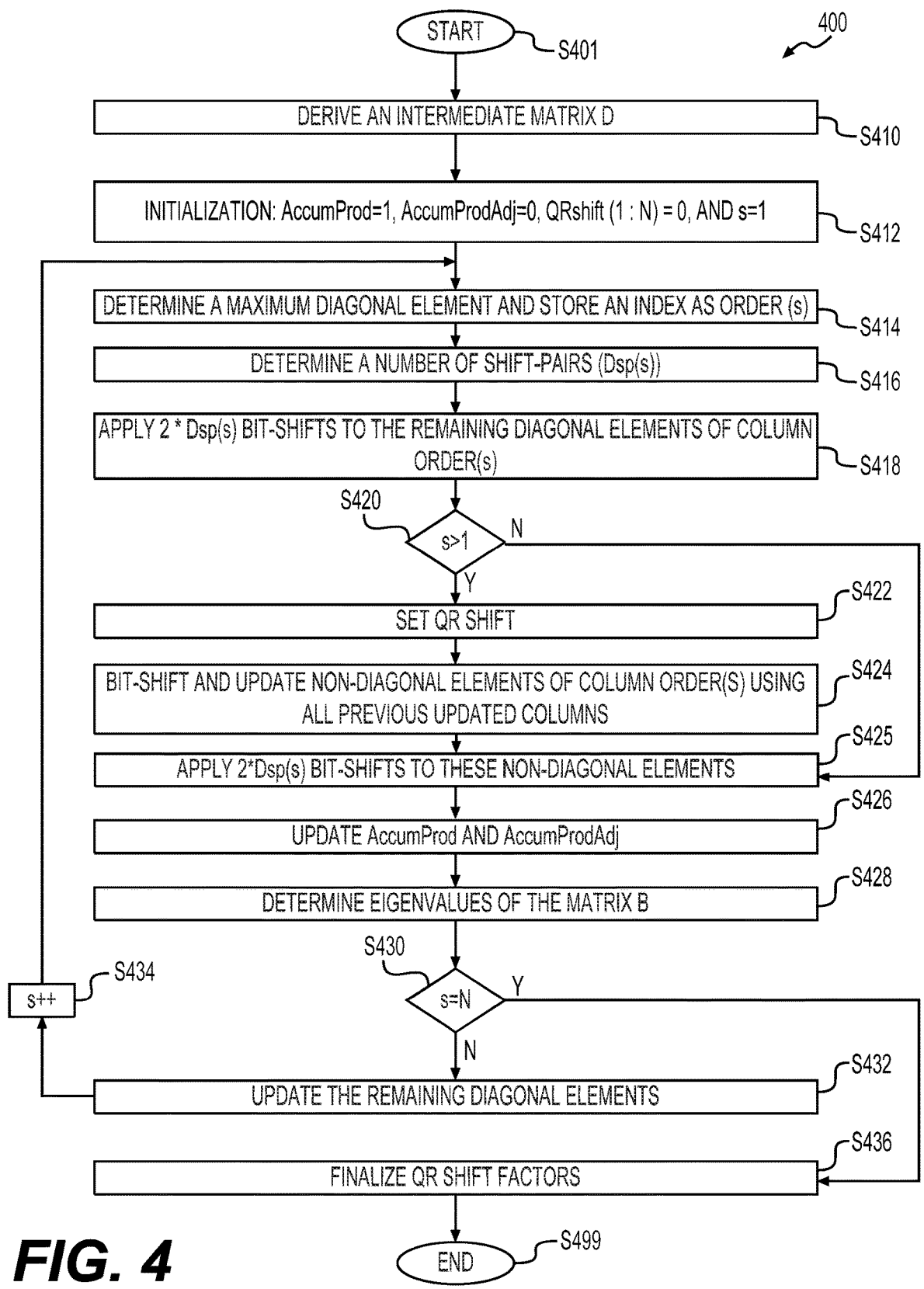
FIG. 4 shows a flowchart of an example process 400 for precomputing column sorting orders and shifting factors from an intermediate matrix B according to some embodiments of the disclosure.

FIG. 4 shows a flowchart of an example process 400 for precomputing column sorting orders and shifting factors (corresponding to the previously described scaling factors) from an intermediate matrix B according to some embodiments of the disclosure. The process 400 corresponds to a second scheme of the parameter precomputation techniques. The process 400 is similar to the process 300 in terms of precomputing parameters useful for a modified QR decomposition based on norms and inner products of the columns of the intermediate matrix B. However, compared with the process 300, the process 400 provides several improvements to further reduce the computation complexity.

As described above, division operations are used in the updating operations in the process 300. In some examples, the division operations are implemented with lookup tables that occupy additional memories, thereby undesirably increasing power consumption and chip areas. Accordingly, a first improvement is adopted in some embodiments to reduce the power consumption and chip areas. Specifically, the following updates are used to obviate the division operations. The diagonal elements updates (norm updates) (e.g., at S322 of the process 300) is performed with $$d_{ii} \leftarrow d_{jj}d_{ii} - |d_{ij}|^2 \text{ instead of } d_{ii} \leftarrow d_{ii} - \frac{|d_{ij}|^2}{d_{jj}}.$$

The non-diagonal elements (inner product updates) (e.g., at S320) is performed with $$d_{ij} \leftarrow d_{kk}d_{ij} - d_{ik}d_{jk}^* \text{ instead of } d_{ij} \leftarrow d_{ij} - \frac{d_{ik}d_{jk}^*}{d_{kk}}.$$

When the above updates are employed, the updated diagonal elements and the updated inner-products (non-diagonal elements) are scaled by a same set of values. In addition, the updated diagonal values are actually multiples of the updated values determined by the first scheme (e.g., the updated diagonal values determined in the process 300). However since a same factor is used for all remaining diagonal elements, the determination of the maximum diagonal element is not affected.

As an example, in an embodiment, the D matrix has dimensions of 4×4, and includes the diagonal elements $D_{11}$, $D_{22}$, $D_{33}$, and $D_{44}$. For example, at a first stage, the first maximum diagonal element of the D matrix is $D_{11}$. After updating of the remaining diagonal elements, the updated $D_{22}$, $D_{33}$, and $D_{44}$ are actually $D_{11}D_{22}^u$, $D_{11}D_{33}^u$, and $D_{11}D_{44}^u$, respectively, where $D_{22}^u$, $D_{33}^u$, $D_{33}^u$ are the updated values that would be determined when the first scheme were employed. As seen, $D_{11}$ is the constant multiplication factor for all remaining elements at this stage. For example, at a second stage, the maximum diagonal elements among these three updated diagonal elements $D_{11}D_{22}^u$, $D_{11}D_{33}^u$, and $D_{11}D_{44}^u$ is $D_{11}D_{22}^u$. Updating the non-diagonal elements of column 2 with column 1 yields updated non-diagonal elements as $D_{11}D_{32}^u$, $D_{11}D_{42}^u$, where $D_{32}^u$ and $D_{42}^u$ are the updated non-diagonals that would be determined when the first scheme were employed. When updating $D_{11}D_{33}^u$ using $D_{11}D_{22}^u$ and $D_{11}D_{32}^u$, since all elements involved in the update are scaled by the same factor $D_{11}$, the updated value will again be some scaled version of the updated value that would be yield by the first scheme. Therefore, the above updating methods do not affect the determination of the column ordering.

In addition, in the above example, when the second scheme of the parameter precomputation techniques is employed in place of the first scheme, the constant multiplying factors introduced at different stages (i.e., after each norm update) are $D_{11}$, $D_{11}D_{22}^u$, and $D_{11}D_{22}D_{33}^u$ where $D_{22}^u$, $D_{33}^{uuu}$ refer to the updated values of $D_{22}$ and $D_{33}$ based on the second scheme, and the sequence of column sorting orders are assumed to be indices from 1 to 4.

A second improvement adopted in some embodiments is that scaling factors are calculated in terms of a number of bit-shifts in the second scheme of the parameter precomputation techniques. Scaling factors calculated in this manner are referred to as shift factors. With the first scheme of the parameter computation techniques, such as at S334 in the process 300, the scaling factors are scalars (real numbers). Compared with the real number scaling factors, shift factors serves the same purpose of using bits efficiently, however, are obtained and used with a lower computation complexity, resulting in a lower power consumption and a faster operation speed.

A third improvement adopted in some embodiments is to use bit-shifting to the D matrix during the process of computing column sorting orders and shift factors based on norms and inner products of the B matrix. As demonstrated above, scaling the entire D matrix by a constant factor does not affect the selection of the maximum diagonal elements. Thus, the bit-shifting operations are applied to the D matrix to realize optimal fixed point performance in some embodiments.

Similarly, the process 400 is explained with reference to the client station 154-1 in FIG. 1. The process 400 starts from S401 and proceeds to S410.

At S410, an intermediate matrix D is derived, for example, in a way similar to the steps of S310 and S312, according to $$B_{N \times N} = H^H H.$$

$$D_{N \times N} = B^H B.$$

At S412, some initiations are performed as follows in an embodiment
AccumProd=1,
AccumProdAdj=0,
array QRshift(1:N)=0,
integer counter s=1.

In an embodiment, the variable AccumProd is used to successively compute product of the updated diagonal elements of the matrix D. The variable AccumProd is used in a way similar to a counter, but unlike the addition operations carried out by a counter, the variable AccumProd is updated by performing multiplication operations in a way that one multiplication operation is performed per stage. In an embodiment, the variable AccumProdAdj is used to keep track of bit-shift pairs applied to AccumProd at each stage to adjust AccumProd, for example, in the range of [0.25,1). In an embodiment, the array QRshift stores some temporary values. Those values can be used to compute a sequence of bit-shift values that are used to bit shift the elements of the B matrix during QR operations in a modified QR decomposition. The steps S414-S434 are iterated for a number of N times, and accordingly, the integer counter s changes from 1 to N.

At S414, a maximum diagonal element is determined among the remaining (N+1−s) diagonal elements of the D matrix in an embodiment. An index of the determined maximum diagonal is stored in a memory as order(s).

At S416, a number of shift-pairs (e.g., each shift-pair includes two bit-shifts) is determined to bit-adjust the maximum diagonal element D(order(s), order(s)) such that one of the two leading bits of the element D(order(s), order(s)) is occupied (i.e., being 1). The number of shift-pairs for the element D(order(s), order(s)) is represented as Dsp(s).

At S418, all the diagonal elements for s=1, or the remaining diagonal elements for s>1 (i.e., diagonal elements with indices $\{1, \ldots, N\} \setminus \{\text{order}(l)\}_{l=1}^{s-1}$), of the D matrix, are scaled by applying a number of 2*Dsp(s) bit-shifts.

At S420, it is determined whether s is greater than 1. For s=1, the steps S422 and S424 are skipped. For s>1, the process 400 continues to S422.

At S422, QRshift(s) is determined, for example, in the following way. When D(order(s), order(s))≥AccumProd, it is set according to $$QR\text{shift}(s) = \text{AccumProdAdj} + 1.$$

Otherwise, it is set according to $$QR\text{shift}(s) = \text{AccumProdAdj}.$$

At S424, non-diagonal elements of column order(s) are scaled using the previous shift factors and updated using the previous columns, in some embodiments, according to For r=1:s−1, (1) Apply 2*Dsp(r) bit-shifts to the non-diagonal elements of column order(s) except those lying on rows having indices of $\{\text{order}(l)\}_{l=1}^{s}$, (2) $d_{ij} \leftarrow d_{kk}d_{ij} - d_{ik}d_{jk}^*$, $i \in \{1, \ldots, N\} \setminus \{\text{order}(l)\}_{l=1}^{s}$, j=order(s), k=order(r). In the above operation, for each previous column order(r), a scaling operation with a number of 2*Dsp(r) bit-shifts and an update operation to the non-diagonal elements of column order(s) are performed.

At S425, 2*Dsp(s) bit-shifts are applied to the non-diagonal elements of column order(s), except the elements lying on the rows having indices of order(1), . . . , order(s), to update those non-diagonal elements.

At S426, the AccumProd and, the AccumProdAdj are updated in some embodiments. For example, the AccumProd is updated according to $$\text{AccumProd} \leftarrow \text{AccumProd} \times D_{(\text{order}(s),\text{order}(s))}.$$

When both leading bits of the updated AccumProd are zero, the following updating is performed AccumProd<<2, AccumProdAdj=AccumProdAdj+1.

At S428, an approximate eigenvalue E(s) of the matrix B corresponding to column order(s) of the D matrix is calculated, in some examples, in the following way:
(1) Compute $\alpha(s)=\|(d_{i,order(s)})_{i\in\{1,\ldots,N\}\setminus\{order(l)\}_{l=1}^{s-1}}\|$, i.e. the square norm of the order(s)-th column vector of the D matrix after leaving out elements that lie on rows order(1), . . . , order(s−1);
(2) Set $\beta(s)$=AccumProd;
(3)

$$\text{Set } \delta(s) = \left(AccumProdAdj - \sum_{i=1}^{s} Dsp(i)\right);$$

(4) The $s^{th}$ eigenvalue is given as $$E(s) = \frac{\alpha(s)}{\sqrt{\beta(s)}} \times 2^{\delta(s)}.$$

At S430, it is determined whether s has reached N. When s reaches N, the process 400 proceeds to S436. Otherwise, the process 400 proceeds to S432.

At S432, the remaining diagonal elements (i.e., all diagonal elements except diagonal elements $\{order(l)\}_{l=1}^{s}$) are updated, in some embodiments, according to $d_{ii} \leftarrow d_{ij}d_{ii}-|d_{ij}|^2, i\in\{1, \ldots, N\}\setminus\{order(l)\}_{l=1}^{s}$,
j=order(s).

At S434, the integer counter s is increased by 1, and the process 400 goes back to S414 where a next maximum diagonal element may be determined.

At S436, the QRshift array is finalized according to
QRshift(1)←−Dsp(1),
For s=N:−1:2

QRshift(s)←Dsp(s)−QRshift(s)+QRshift(s−1).

In the above operations, s changes from N to 2 with a step value of −1. The QRshift(s) is derived based on the Dsp(s), QRshift(s), and QRshift(s−1). The process 400 proceeds to S499, and terminates at S499.

The final output of the process 400 includes a first sequence of column sorting orders, which gives the order for column sorting in a modified QR decomposition, and a second sequence of shift factors (i.e., the QRshift values in the QRshift array), which gives the numbers and the directions of bit-shifts for element scalings in a modified QR decomposition process. For example, in an embodiment, the first shift factor Dsp(1) can be applied rightwards or leftwards. Other shift-factors Dsp(s), s>1 can indicate leftward shifts. In an embodiment, the element Dsp(1) and the first element of the QRshift array are allowed to be signed numbers, while other elements can be un-signed. The output of the process 400 can be used as an input of a modified QR decomposition process that, for example, may be performed with CORDIC blocks.

In some embodiments, some techniques are employed to avoid errors in computing column sorting orders and shift factors. In an embodiment, while updating diagonal elements, an updating of a diagonal element is skipped when the diagonal element has a zero or negative value. In an embodiment, at the step of determining the maximum diagonal element, the precomputation process is aborted if the maximum diagonal element turns out to be zero or negative. Both the above techniques can be used for the first or the second scheme of the parameter precomputation techniques.

In some embodiments, when an abort condition is hit, some finalization operations are still performed to obtain partial computation results that are useful for subsequent processing operations. For example, during the process 400, once an abort condition is hit, the rest of the elements of QRshift array and the Dsp(s) sequence are set to be zero. The finalization step S436 is completed to determine a partial sequence of shift factors. During the process 300, once an abort condition is hit, the step S334 is performed with the previously determined maximum diagonal elements to compute a partial sequence of scalar factors. In addition, in some examples, during the process 300 or 400, once an abort condition is hit, the remaining eigenvalues that have not been calculated yet are set to 0.

In some embodiments, when the abort condition is hit, the partially obtained sequence of sorting orders and scaling factors (in a form of scalar factors or shift factors) are still valid, and are used as an input to a modified QR decomposition process.

Figure 5:
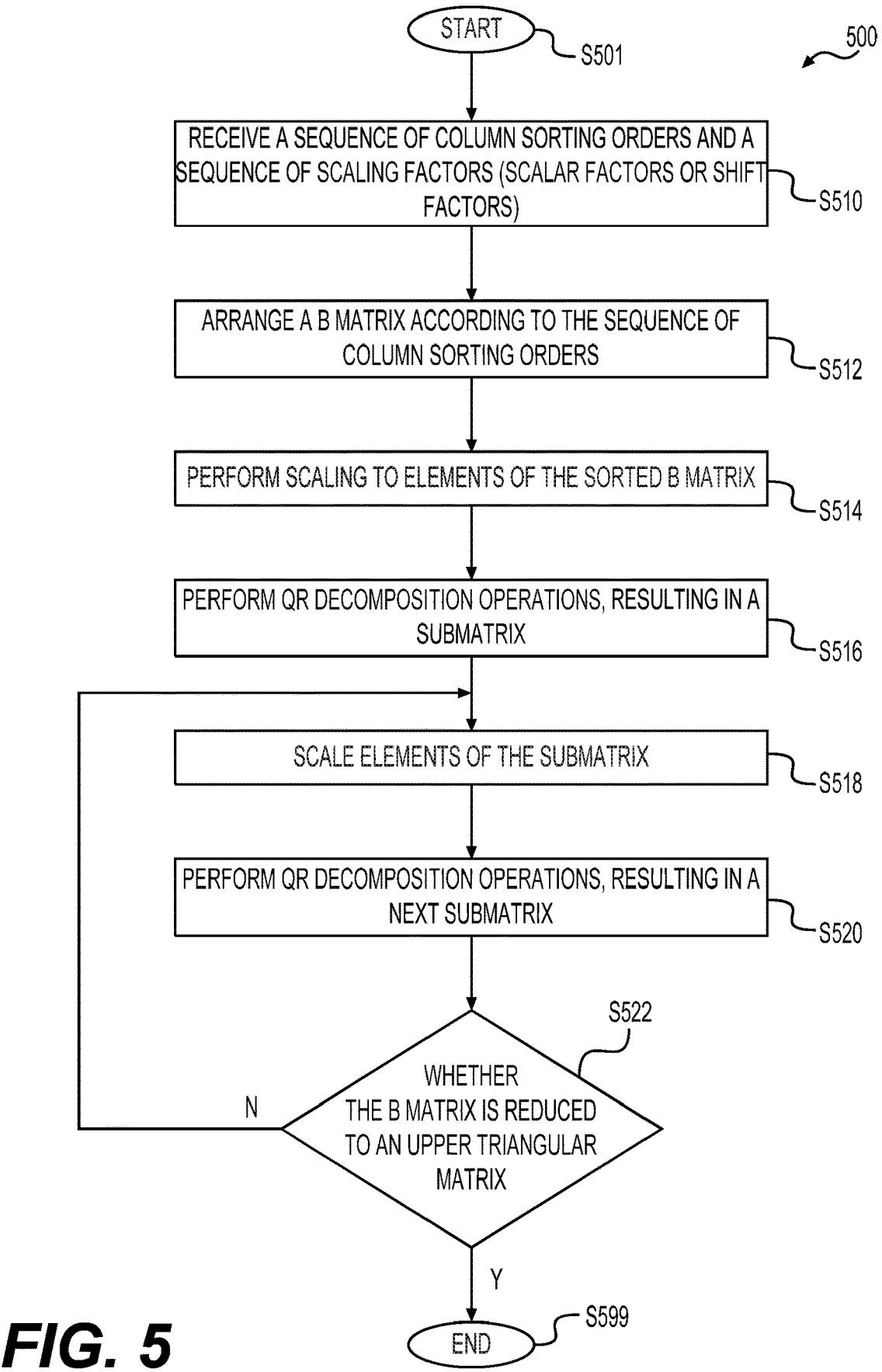
FIG. 5 shows a flowchart of an example modified QR decomposition process 500 that implements the parameter precomputation techniques according to some embodiments of the disclosure.

FIG. 5 shows a flowchart of an example modified QR decomposition process 500 that implements the parameter precomputation techniques according to some embodiments of the disclosure. Similar to the process 200, the process 500 jointly determines a steering matrix and a compressed beamforming feedback (e.g., angles) that represents the steering matrix by multiple stages of QR decompositions. However, different from the process 200 where column sorting and scaling factor determination are performed at each stage of QR decomposition, the process 500 receives column sorting orders and scaling factors that are precomputed in advance of the modified QR decomposition process 500. By separating the parameter precomputation from the modified QR decomposition process, the modified QR decomposition process can be performed smoothly without the delay caused by operations of column sorting and scaling factor determining. In addition, the parameter precomputation is based on norms and inner products of the intermediate matrix B, thereby further decreasing the computation complexity. The process 500 is explained with reference to the client station 154-1 in FIG. 1. The process 500 starts from S501 and proceeds to S510.

At S510, a sequence of column sorting orders and a sequence of scaling factors (scalar factors or shift factors) derived from a B matrix are received and used as an input to the process 500. The column sorting orders or the scaling factors are output of a process implementing the first scheme of the precomputation techniques (e.g., the process 300) or a process implementing the second scheme of the precomputation techniques in various embodiments. For example, the sequence of column sorting orders includes orders represented as order(s), s=1, N, while the sequence of scaling factors includes scaling factors represented as QRscale(s), s=1, N for the first scheme or bit-shift factors QRshift(s), s=1, . . . , N for the second scheme At S512, the columns of the B matrix are arranged or sorted according to the sequence of column sorting orders. In an embodiment, columns of the B matrix are arranged according to $B_{ordered}=[\vec{b}_{order(1)} \ldots \vec{b}_{order(N)}]$, where $B_{ordered}$ is the matrix B with rearranged columns, and the sequence of $\vec{b}$ i are column vectors of the B matrix. In an embodiment, the QR decomposition is performed with CORDIC block, and the sorting is performed before the B matrix is fed to the CORDIC block.

At S514, scaling operations are performed to the elements of the sorted B matrix, for example, with the scaling factor QRscale(1) corresponding to the first column of the sorted B matrix. Bit-shiftings are performed as the scaling operations when the scaling factor is a shift factor.

At S516, a set of QR decomposition operations, for example, including phase rotations and Givens rotations are performed successively to the scaled B matrix to null out elements, except the first element, of the first column of the scaled B matrix, resulting in a submatrix. For example, angles used in the phase rotations and the Givens rotations are stored as a portion of the compressed beamforming feedback. In an embodiment, a CORDIC block is used for performing the phase rotations and the Givens rotations. The bit-shifting operations at S514 are performed before inputting the B matrix to the CORDIC block for the phase rotation operations. Subsequently, no bit-shifting operations are performed before or during the Givens rotation operations in an embodiment.

The steps S518-S522 are iteratively performed to a series of submatrices until the B matrix is reduced to an upper triangular matrix (an R matrix). The steps S518 and S520 are performed in a manner similar to the steps S514 and S516, but over a respective submatrix. For example, elements of a submatrix generated from a previous step are scaled with a scaling factor in the sequence of scaling factors corresponding to the first column of the submatrix (a column next to the column that is nulled out in the previous step). Subsequently, a set of QR decomposition operations are performed to null out elements, except the first element, of the first column of the submatrix.

Angles resulting from each set of QR decompositions at S520 are stored as a portion of the compressed beamforming feedback. Diagonal elements of the resultant R matrix each occupy the most significant bit due to the scaling operations at S514 and S518 in some embodiments. The process proceeds to S599, and terminates at S599.

As described in the FIG. 3 and FIG. 4 examples, approximate eigenvalues for the first intermediate matrix B are computed during the process of precomputing the column sorting orders and the scaling/shift factors. However, in some other embodiments, approximate eigenvalues for the first intermediate matrix B are computed based on an R matrix resulting from a modified QR decomposition and the knowledge of the scaling or shift factors (e.g., QRscale factors or QR shift factors). For example, the R matrix can be derived from a modified QR decomposition process with or without implementing the parameter precomputation techniques, such as the processes described with reference to FIG. 2, 3 or 4. The scaling or shift factors can be derived from a modified QR decomposition process without implementing the parameter precomputation techniques (e.g., the FIG. 2 example), or can be obtained from a process of precomputing the scaling/shift factors (e.g., the FIG. 3 or FIG. 4 example).

An exemplary process for computing approximate eigenvalues for the first intermediate matrix B based on an R matrix and the knowledge of scaling/shift factors is described below. In an embodiment, the R matrix, referred to as the modified R matrix, derived from a modified QR decomposition takes the following form:

$$\begin{bmatrix} s_1 r_{11} & s_1 r_{12} & s_1 r_{13} & s_1 r_{14} & s_1 r_{15} & s_1 r_{16} & s_1 r_{17} & \ldots & s_1 r_{1N} \\ 0 & s_1 s_2 r_{22} & s_1 s_2 r_{23} & s_1 s_2 r_{24} & s_1 s_2 r_{25} & s_1 s_2 r_{26} & s_1 s_2 r_{27} & \ldots & s_1 s_2 r_{2N} \\ 0 & 0 & s_1 s_2 s_3 r_{33} & s_1 s_2 s_3 r_{34} & s_1 s_2 s_3 r_{35} & s_1 s_2 s_3 r_{36} & s_1 s_2 s_3 r_{37} & \ldots & s_1 s_2 s_3 r_{3N} \\ 0 & 0 & 0 & \left(\prod_{k=1}^{4} s_k\right) r_{44} & \left(\prod_{k=1}^{4} s_k\right) r_{45} & \ldots & \ldots & \ldots & \left(\prod_{k=1}^{4} s_k\right) r_{4N} \\ 0 & 0 & 0 & 0 & \left(\prod_{k=1}^{5} s_k\right) r_{55} & \ldots & \ldots & \ldots & \left(\prod_{k=1}^{5} s_k\right) r_{5N} \\ 0 & 0 & 0 & 0 & 0 & \ddots & \vdots & \vdots & \vdots \\ 0 & 0 & 0 & 0 & 0 & 0 & \left(\prod_{k=1}^{L} s_k\right) r_{LL} & \vdots & \left(\prod_{k=1}^{L} s_k\right) r_{LN} \\ 0 & 0 & 0 & 0 & 0 & 0 & 0 & \ddots & \vdots \\ 0 & 0 & 0 & 0 & 0 & 0 & 0 & 0 & \left(\prod_{k=1}^{N} s_k\right) r_{NN} \end{bmatrix}$$

where $s_i$ represents a scaling factor (e.g., QRscale[i]), and $r_{ij}$ represents an element of an R matrix, referred to as unscaled R matrix, that would be obtained if the respective modified QR decomposition was carried out without applying the respective scaling factors. As seen, an element, $R_{ij}$, of the modified R matrix can be represented as, $$R_{ij} = (\Pi_{k=1}^{i} s_k) r_{ij}.$$

In an embodiment, an i-th eigenvalue of the intermediate B matrix can be approximated by the norm of the i-th row of the unscaled R matrix according to:

$$E_i = \sqrt{\sum_{j=i}^{N} r_{ij}^2}.$$

Accordingly, the i-th eigenvalue can be calculated according to;

$$E_i = \frac{\sqrt{\sum_{j=i}^{N} R_{ij}^2}}{\prod_{k=1}^{i} s_k}.$$

Similarly, in an embodiment, when shift factors are employed in place of the scaling factors, the i-the eigenvalue in the above exemplary process can be derived according to:

$$E_i = \sqrt{\sum_{j=i}^{N} R_{ij}^2} \times 2^{-\sum_{k=1}^{i} f_k},$$

where $f_k$ represents a shift factor (e.g., QRshift[i]).

Figure 6:
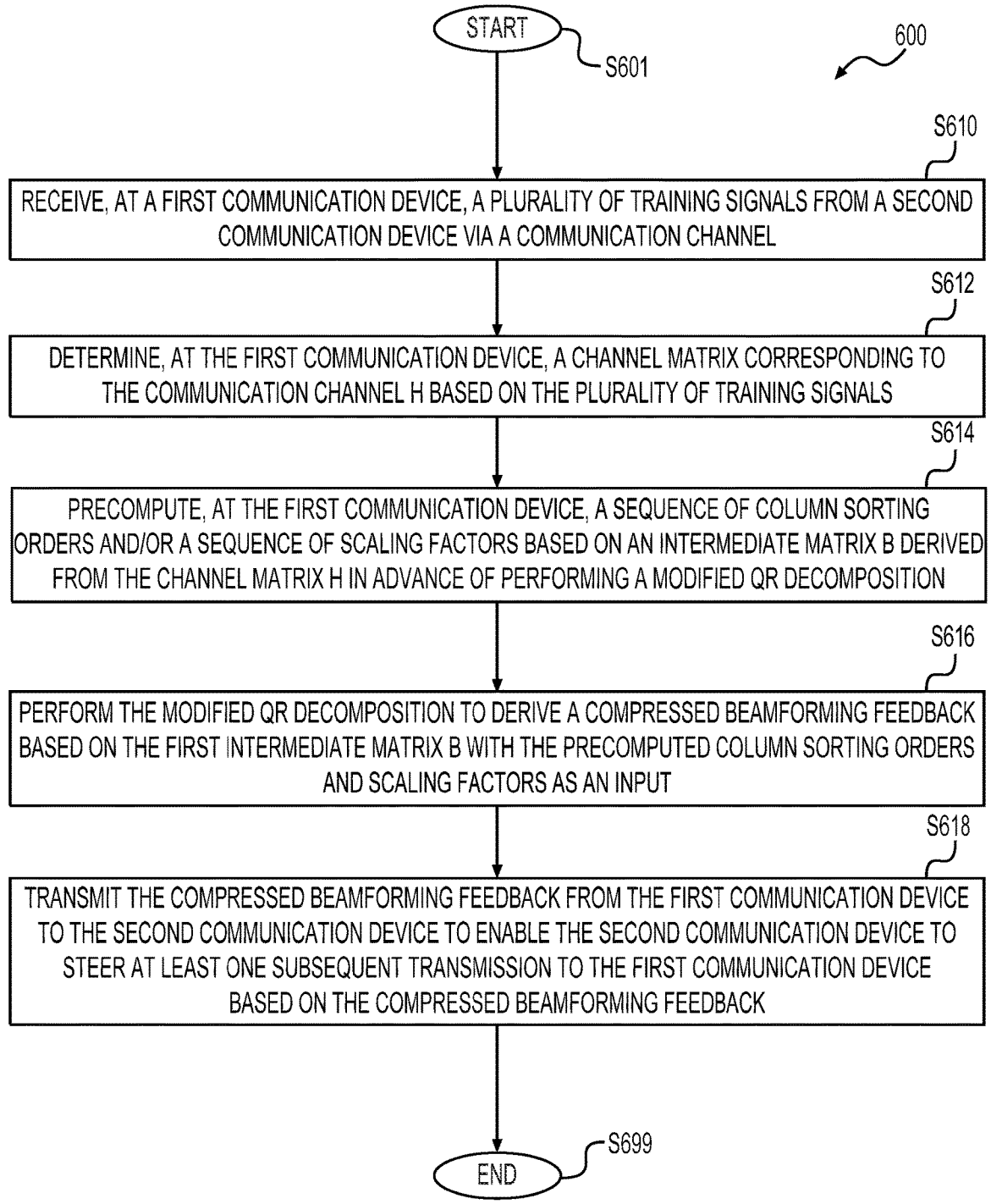
FIG. 6 shows a flowchart of an example process 600 for providing a compressed beamforming feedback of a communication channel according to some embodiments of the disclosure.

FIG. 6 shows a flowchart of an example process 600 for providing a compressed beamforming feedback of a communication channel according to some embodiments of the disclosure. The parameter precomputation techniques described herein are employed to reduce computation complexity, improve processing speed, lower power consumption, and reduce chip areas. For example, column sorting orders and scaling factors are precomputed in advance of performing a modified QR decomposition.

In an embodiment, the process 600 is implemented by a first communication device. With reference to FIG. 1, process 600 is implemented by the network interface device 162, in an embodiment. For example, in one such embodiment, the PHY processor 170 is configured to implement the process 600. According to another embodiment, the MAC processor 166 is also configured to implement at least a part of the process 600. With continued reference to FIG. 1, in yet another embodiment, the process 600 is implemented by the network interface device 122 (e.g., the PHY processor 130 and/or the MAC processor 126). In other embodiments, the process 600 is implemented by other suitable network interface devices.

The process 600 starts from S601 and proceeds to S610.

At S610, a plurality of training signals are received from a second communication device via the communication channel. In an embodiment, a sounding packet is received, wherein the sounding packet includes the plurality of training signals. In an embodiment, the training signals are received in one or more LTF fields of a sounding packet. In other embodiments, the training signals are received in other suitable manners.

At S612, a channel matrix, H, corresponding to the communication channel is determined. In an embodiment, the channel matrix is determined based on the training signals received at S610.

At S614, a sequence of column sorting orders and/or a sequence of scaling factors are precomputed based on an intermediate matrix B derived from the channel matrix H in advance of performing a modified QR decomposition. In an embodiment, the first scheme of the parameter precomputation techniques (e.g., the process 300) is used. In an embodiment, the second scheme of the parameter precomputation techniques (e.g., the process 400) is used. In an embodiment, techniques from the first scheme or the second scheme are used in combination. For example, the technique of using multiplication operations in place of division operations to update diagonal or non-diagonal elements is used in combination with the first scheme in an embodiment. The scaling factors in the form of scalar factors are transformed into shift factors that are subsequently used as an input to the modified QR decomposition in an embodiment. In addition, only column sorting orders or only scaling factors are precomputed that are used as an input to a modified QR decomposition in some embodiments.

At S616, the modified QR decomposition is performed to derive the compressed beamforming feedback based on the first intermediate matrix B. The column sorting orders and/or scaling factors precomputed at S614 are used as an input to the modified QR decomposition in an embodiment.

At S618, the compressed beamforming feedback determined at S616 is transmitted to the second communication device. In an embodiment, the compressed beaforming feedback is transmitted to the second communication device to enable the second communication device to steer, based on the compressed beamforming feedback, at least one subsequent transmission to the first communication device. Accordingly, the first communication device is configured to receive at least one subsequent transmission, steered based on the compressed beamforming feedback, from the second communication device, in an embodiment. The process proceeds to S699, and terminates at S699.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving, at a first communication device, a plurality of training signals from a second communication device via a communication channel;
determining, at the first communication device, a channel matrix H corresponding to the communication channel based on the plurality of training signals;
precomputing, at the first communication device, a sequence of column sorting orders and/or a sequence of scaling factors based on a first intermediate matrix B derived from the channel matrix H in advance of performing a modified QR decomposition;
performing the modified QR decomposition to derive a compressed beamforming feedback based on the first intermediate matrix B with the precomputed column sorting orders and/or scaling factors as an input; and transmitting the compressed beamforming feedback from the first communication device to the second communication device to enable the second communication device to steer, based on the compressed beamforming feedback, at least one subsequent transmission from the second communication device to the first communication device.

2. The method of claim 1, wherein the precomputing the sequence of column sorting orders and/or the sequence of scaling factors based on the first intermediate matrix B derived from the channel matrix H in advance of performing the modified QR decomposition comprises:

determining the sequence of column sorting orders and the sequence of scaling factors based on norms and inner products of columns of the first intermediate matrix B.

3. The method of claim 1, wherein the precomputing the sequence of column sorting orders and/or the sequence of scaling factors based on the first intermediate matrix B derived from the channel matrix H in advance of performing the modified QR decomposition comprises:

deriving the first intermediate matrix B according to $B=H^H H$;

deriving a second intermediate matrix D according to $D_{N \times N}=B^H B$; and determining the sequence of column sorting orders and/or the sequence of scaling factors based on the second intermediate matrix D.

4. The method of claim 3, wherein the determining the sequence of column sorting orders and/or the sequence of scaling factors based on the second intermediate matrix D comprises:

(a) identifying a first maximum diagonal element of the second intermediate matrix D;
(b) storing a column index of the first identified maximum diagonal element as order(1) that is a first column sorting order in the sequence of column sorting orders;
(c) updating the diagonal elements, except the identified first maximum diagonal element, of the second intermediate matrix D, according to $$d_{ii} \leftarrow d_{ii} - \frac{|d_{ij}|^2}{d_{jj}}, i \in \{1, \ldots, N\} \backslash \text{order}(1), j = \text{order}(1)$$

where d represents an element of the second intermediate matrix D, and i or j represents a row or column index;

(d) identifying a second maximum diagonal element among the updated diagonal elements; and
(e) storing a column index of the second identified maximum diagonal element as order(2) that is a second column sorting order in the sequence of column sorting orders.

5. The method of claim 4, wherein the determining the sequence of column sorting orders and/or the sequence of scaling factors based on the second intermediate matrix D further comprises:

(f) updating non-diagonal elements of the column order (2) of the second intermediate matrix D with elements of column order (1) of the second intermediate matrix D according to $$d_{ij} \leftarrow d_{ij} - \frac{d_{ik} d_{jk}^*}{d_{kk}}, i \in \{1, \ldots, N\} \backslash \{\text{order}(1), \text{order}(2)\},$$

$$j = \text{order}(2), k = \text{order}(1);$$

(g) updating the diagonal elements, except the previously identified first and second maximum diagonal elements, of the second intermediate matrix D, according to $$d_{ii} \leftarrow d_{ii} - \frac{|d_{ij}|^2}{d_{jj}}, i \in \{1, \ldots, N\} \backslash \{\text{order}(1), \text{order}(2)\}, j = \text{order}(2);$$

(h) identifying a third maximum diagonal element among the diagonal elements updated at the step of (g); and
(i) storing a column index of the third identified maximum diagonal element as order(3) that is a third column sorting order in the sequence of column sorting orders.

6. The method of claim 5, wherein the determining the sequence of column sorting orders and/or the sequence of scaling factors based on the second intermediate matrix D further comprises:

(j) updating non-diagonal elements of the column order(3) of the second intermediate matrix D with elements of column order (1) of the second intermediate matrix D according to $$d_{ij} \leftarrow d_{ij} - \frac{d_{ik} d_{jk}^*}{d_{kk}}, i \in \{1, \ldots, N\} \backslash \{\text{order}(l)\}_{l=1}^3,$$

$$j = \text{order}(3), k = \text{order}(1);$$

(k) further updating the non-diagonal elements of the column order(3) that are updated at the step of (j) with elements of column order (2) of the second intermediate matrix D according to $$d_{ij} \leftarrow d_{ij} - \frac{d_{ik} d_{jk}^*}{d_{kk}}, i \in \{1, \ldots, N\} \backslash \{\text{order}(l)\}_{l=1}^3,$$

$$j = \text{order}(3), k = \text{order}(2);$$

(l) updating the diagonal elements, except the previously identified first, second and third maximum diagonal elements, of the second intermediate matrix D, according to $$d_{ii} \leftarrow d_{ii} - \frac{|d_{ij}|^2}{d_{jj}}, i \in \{1, \ldots, N\} \backslash \{\text{order}(l)\}_{l=1}^3, j = \text{order}(3);$$

(m) identifying a fourth maximum diagonal element among the diagonal elements updated at the step of (l); and
(n) storing a column index of the fourth identified maximum diagonal element as order(4) that is a fourth column sorting order in the sequence of column sorting orders.

7. The method of claim 4, wherein the determining the sequence of column sorting orders and/or the sequence of scaling factors based on the second intermediate matrix D further comprises:

iterating the following steps for index k from 2, 3, . . . , N−1:

(i) updating non-diagonal elements of column order(k) with the elements of the columns from column order(l) to column order(k−1) according to for each p=1, ..., k−1, performing:

$$d_{ij} \leftarrow d_{ij} - \frac{d_{ir}d_{jr}^*}{d_{rr}}, i \in \{1, \ldots, N\} \backslash \{\text{order}(l)\}_{l=1}^k,$$

$$j = \text{order}(k), r = \text{order}(p),$$

(ii) updating the diagonal elements, except the previously identified maximum diagonal elements, according to $$d_{ii} \leftarrow d_{ii} - \frac{|d_{ij}|^2}{d_{jj}}, i \in \{1, \ldots, N\} \backslash \{\text{order}(l)\}_{l=1}^k, j = \text{order}(k),$$

(iii) determining a (k+1)-th maximum diagonal element among the diagonal elements updated at the step (ii), and (iv) storing a column index of the (k+1)-th identified maximum diagonal element as order(k+1) that is a (k+1)-th column sorting order in the sequence of column sorting orders.

8. The method of claim 7, wherein the precomputing the sequence of column sorting orders and/or the sequence of scaling factors based on the first intermediate matrix B derived from the channel matrix H in advance of performing the modified QR decomposition comprises:

determining a first scaling factor, QRscale(1), according to $$QRscale(1) = \frac{1}{\sqrt{d_{(\text{order}(1),\text{order}(1))}}};$$

and determining scaling factors, QRscale(i), based on the resultant updated diagonal elements according to $$QRscale(i) = \sqrt{\frac{d_{(\text{order}(i-1),\text{order}(i-1))}}{d_{(\text{order}(i),\text{order}(i))}}}, i = 2, \ldots, N.$$

9. The method of claim 7, further comprising:
determining approximate eigenvalues of the first intermediate matrix B according to $$E(k) = \left\|(d_{i,j})_{i \in \{1,\ldots,N\}, j=\text{order}(k)}\right\|^{\frac{1}{2}}, k = 1,$$

$$E(k) = \left\|(d_{i,j})_{i \in \{1,\ldots,N\} \backslash \{\text{order}(l)\}_{l=1}^{k-1}, j=\text{order}(k)}\right\|^{\frac{1}{2}}, k = 2, \ldots, N$$

where k is an index of a column sorting order in the sequence of column sorting orders, and E(k) represents an eigenvalue corresponding to the column order(k) of the second intermediate matrix D.

10. The method of claim 3, wherein the determining the sequence of column sorting orders and/or the sequence of scaling factors based on the second intermediate matrix D comprises:

iterating the following steps for index s from 1 to N:
(1) determining a maximum diagonal element among all the diagonal elements of the second intermediate matrix D for s=1, or among the diagonal elements, except diagonal elements $\{\text{order}(l)\}_{l=1}^{s-1}$, of the second intermediate matrix D for s>1;

(2) storing a column index of the determined maximum diagonal element as order(s) that is the s-th sorting order of the sequence of column sorting orders;

(3) determining a number of shift-pairs, represented as Dsp(s), to bit-adjust the maximum diagonal element D(order(s), order(s)) such that one of the two leading bits of the element D(order(s), order(s)) is 1; and (4) applying a number of 2*Dsp(s) bit-shifts to all the diagonal elements for s=1, or to the diagonal elements, except diagonal elements $\{\text{order}(l)\}_{l=1}^{s-1}$, for s>1 of the D matrix.

11. The method of claim 10, wherein the determining the sequence of column sorting orders and/or the sequence of scaling factors based on the second intermediate matrix D further comprises:

iterating the following steps for the index s from 1 to N−1:
(5) updating non-diagonal elements of column order(s) using previously updated columns according to
For r=1: s−1, iterating the following steps (i) and (ii),
(i) Apply 2*Dsp(r) bit-shifts to the non-diagonal elements of column order(s) lying on rows having indices of $i \in \{1, \ldots, N\} \backslash \{\text{order}(l)\}_{l=1}^s$,
(ii) $d_{ij} \leftarrow d_{kk}d_{ij} - d_{ik}d_{jk}^*$, $i \in \{1, \ldots, N\} \backslash \{\text{order}(l)\}_{l=1}^s$, j=order(s), k=order(r),
wherein the step (5) is skipped for s=1.

12. The method of claim 11, wherein the determining the sequence of column sorting orders and/or the sequence of scaling factors based on the second intermediate matrix D further comprises:

iterating the following steps for the index s from 1 to N:
(6) applying 2*Dsp(s) bit-shifts to the non-diagonal elements of column order(s) lying on rows having indices of $i \in \{1, \ldots, N\} \backslash \{\text{order}(l)\}_{l=1}^s$.

13. The method of claim 12, wherein the determining the sequence of column sorting orders and/or the sequence of scaling factors based on the second intermediate matrix D further comprises:

iterating the following steps for the index s from 1 to N:
(7) updating non-zero elements among the diagonal elements, except diagonal elements $\{\text{order}(l)\}_{l=1}^s$, according to $d_{ii} \leftarrow d_{jj}d_{ii} - |d_{ij}|^2$, $i \in \{1, \ldots, N\} \backslash \{\text{order}(l)\}_{l=1}^s$,
j=order(s), wherein the step (7) is skipped for s=N.

14. The method of claim 12, wherein the determining the sequence of column sorting orders and/or the sequence of scaling factors based on the second intermediate matrix D further comprises:

performing the following initialization:
AccumProd=1,
AccumProdAdj=0,
array QRshift(1:N)=0; and
iterating the following steps for the index s from 1 to N:
(8) setting QRshift(s) according to
when the maximum diagonal element D(order(s), order(s)) is greater than or equal to AccumProd, setting QRshift(s)=AccumProdAdj+1, and
when the maximum diagonal element D(order(s), order(s)) is less than AccumProd, setting QRshift(s)=AccumProdAdj;
(9) updating AccumProd according to AccumProd ← AccumProd × $D_{(\text{order}(s),\text{order}(s))}$; and

(10) when both leading bits of the AccumProd updated at (9) are zero, updating the AccumProd according to AccumProd<<2, and updating the AccumProdAdj according to AccumProdAdj=AccumProdAdj+1, wherein the step (8) is skipped for s=1.

15. The method of claim 14, wherein the determining the sequence of column sorting orders and/or the sequence of scaling factors based on the second intermediate matrix D further comprises:
    iterating the following step for the index s from 1 to N:
    (11) determining an approximate eigenvalue E(s) of the first intermediate matrix B corresponding to column order(s) of the D matrix by performing
        (i) computing $\alpha(s) = \|(d_{i,order(s)})_{i \in \{1, \ldots, N\} \setminus \{order(l)\}_{l=1}^{|s-1|}}\|$,
        (ii) setting $\beta(s)$=AccumProd,
        (iii) setting $$\delta(s) = \left( AccumProdAdj - \sum_{i=1}^{s} Dsp(i) \right),$$

and
    (iv) determining the approximate eigenvalue E(s) according to $$E(s) = \frac{\alpha(s)}{\sqrt{\beta(s)}} \times 2^{\delta(s)}.$$

16. The method of claim 15, wherein the determining the sequence of column sorting orders and/or the sequence of scaling factors based on the second intermediate matrix D further comprises:
    stopping the iteration of steps (1)-(11) after the approximate eigenvalue E(N) is determined.

17. The method of claim 15, wherein the determining the sequence of column sorting orders and/or the sequence of scaling factors based on the second intermediate matrix D further comprises:
    aborting the iteration of the steps (1)-(11) when the maximum diagonal element determined at the step (1) is zero or negative.

18. The method of claim 17, further comprising:
    after the abortion operation, performing the modified QR decomposition to derive the compressed beamforming feedback based on the first intermediate matrix B with the partially obtained sequences of column sorting orders and scaling factors as the input.

19. The method of claim 14, wherein the determining the sequence of column sorting orders and/or the sequence of scaling factors based on the second intermediate matrix D further comprises:
    finalizing the QRshift array according to
    QRshift(1)←Dsp(1), and
    For s=N:-1:2, $QR\text{shift}(s) \leftarrow Dsp(s) - QR\text{shift}(s) + QR\text{shift}(s-1)$, wherein s changes from N to 2 with a step value of −1.

20. The method of claim 1, wherein the performing the modified QR decomposition to derive the compressed beamforming feedback based on the first intermediate matrix B with the precomputed column sorting orders and/or scaling factors as the input comprises:
    sorting columns of the first intermediate matrix B according to the sequence of column sorting orders each indicating a column index.

21. The method of claim 20, wherein the performing the modified QR decomposition to derive the compressed beamforming feedback based on the first intermediate matrix B with the precomputed column sorting orders and/or scaling factors as the input further comprises:
    (a) scaling elements of the sorted intermediate matrix B with a scaling factor in the sequence of scaling factors corresponding to the first column of the sorted intermediate matrix B; and
    (b) performing a set of QR decomposition operations to null out elements, except the first element, of the first column of the sorted intermediate matrix B to generate a submatrix.

22. The method of claim 21, wherein the performing the modified QR decomposition to derive the compressed beamforming feedback based on the first intermediate matrix B with the precomputed column sorting orders and/or scaling factors as the input further comprises:
    (c) scaling elements of the submatrix generated from the previous step with a scaling factor in the sequence of scaling factors corresponding to a first column of the submatrix; and
    (d) performing a set of QR decomposition operations to null out elements, except the first element, of the first column of the submatrix.

23. The method of claim 22, wherein the performing the modified QR decomposition to derive the compressed beamforming feedback based on the first intermediate matrix B with the precomputed column sorting orders and/or scaling factors as the input further comprises:
    (e) iterating the steps of (c) and (d) until the intermediate matrix B is reduced to an upper triangular matrix.

24. The method of claim 23, wherein the set of QR decomposition operations performed during each iteration includes phase rotations and Given's rotations.

25. The method of claim 24, wherein angles obtained from the phase rotations and Given's rotations are part of the compressed beamforming feedback.

26. The method of claim 23, wherein the set of QR decomposition operations are performed with a coordinate rotation digital computer (CORDIC) block.

27. The method of claim 1, further comprising:
    deriving approximate eigenvalues of the first intermediate matrix B based on a matrix R resulting from the modified QR decomposition and the precomputed scaling factors.

28. A first communication device, comprising circuitry configured to:
    receive a plurality of training signals from a second communication device via a communication channel;
    determine a channel matrix H corresponding to the communication channel based on the plurality of training signals;
    precompute a sequence of column sorting orders and/or a sequence of scaling factors based on a first intermediate matrix B derived from the channel matrix H in advance of performing a modified QR decomposition;
    perform the modified QR decomposition to derive a compressed beamforming feedback based on the first intermediate matrix B with the precomputed column sorting orders and/or scaling factors as an input; and
    transmit the compressed beamforming feedback to the second communication device to enable the second communication device to steer, based on the compressed beamforming feedback, at least one subsequent transmission from the second communication device to the first communication device.

* * * * *